June 26, 1923.
M. B. BANOWETZ
BEARING HOLDER
Filed Aug. 12, 1922
1,460,011
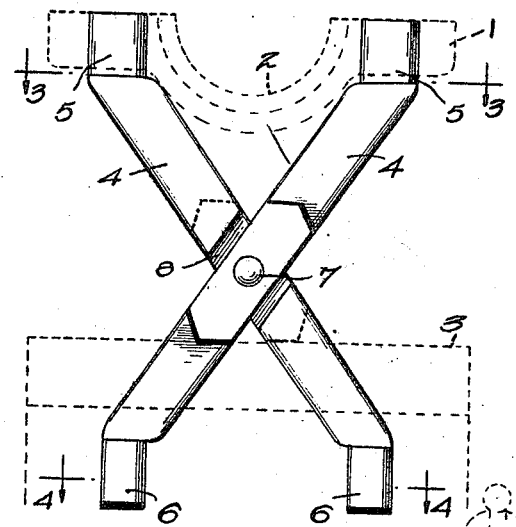
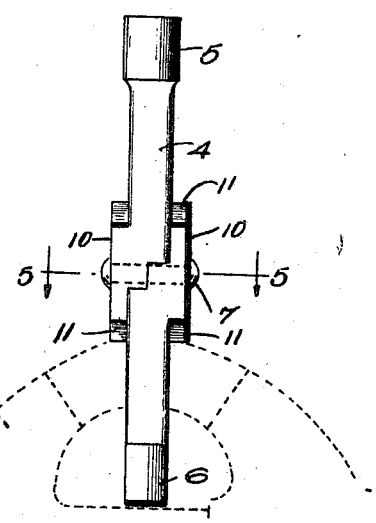
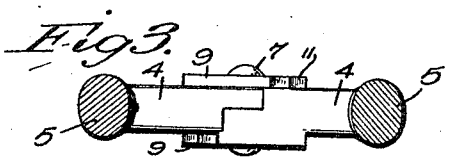
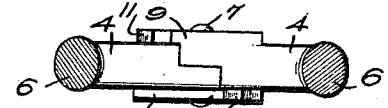
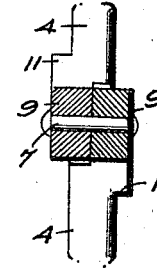
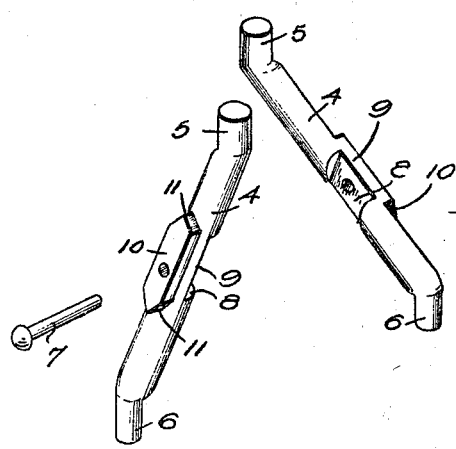
Inventor
MATHIAS B. BANOWETZ
By
Attorney Patented June 26, 1923.

1,460,011

UNITED STATES PATENT OFFICE.

MATHIAS B. BANOWETZ, OF CHARLOTTE, IOWA.

BEARING HOLDER.

Application filed August 12, 1922. Serial No. 581,485.

*To all whom it may concern:*

Be it known that I, MATHIAS B. BANOWETZ, a citizen of the United States, residing at Charlotte, in the county of Clinton and State of Iowa, have invented certain new and useful Improvements in Bearing Holders, of which the following is a specification.

This invention relates to bearing holders, and more particularly to means for supporting a bearing member in a vise.

In the present invention, I provide a pair of cross arms pivotally connected to each other, the arms being provided with offset rounded ends, adapted to be received in openings in a bearing member.

An object of the invention is the provision of an adjustable holder which may be employed for supporting various size bearing members.

A further object is the provision of a support or holder that will prevent the bearing from contacting with the walls of a vise and being injured.

In the accompanying drawings, I have shown one embodiment of the invention.

Figure 1 is a front elevation, the vise and bearing member being shown in dotted lines, Figure 2 is a side elevation, Figure 3 is a transverse sectional view on line 3—3 of Figure 1, Figure 4 is a similar view on line 4—4 of Figure 1, Figure 5 is a similar view on line 5—5 of Figure 2, and, Figure 6 is a perspective view of the parts of the holder detached.

Referring to the drawings, the reference numeral 1 designates a bearing member which is to be supported for the purpose of finishing the bearing portion 2. 3 designates a vise in which the bearing member is to be supported. It has heretofore been customary to place the bearing member in the vise, tightening the jaws of the vise in contact with the bearing member to retain it in position. When sufficient pressure is applied to securely hold the bearing member in position, the bearing member is possibly injured where it contacts with the walls of the vise.

In the present invention, I provide a holder consisting of cross arms 4, each arm being provided with offset ends 5 and 6. These offset ends are adapted to be received in openings in the bearing member, to secure the support or holder thereto. By referring to Figures 3 and 4 of the drawings, it will be noted that the ends 5 are larger than the ends 6, which permit the holder to be employed with bearing members having various size openings. The arms 5 or 6 are arranged in the openings in the bearing and the other arms are received between the jaws of the vise, as shown in Figure 2 of the drawings. As shown, the arms are pivotally connected to each other, by means of a pin 7, permitting them to be adjusted to various angles and used on different bearings in which the openings are spaced at varied distances from each other. Where the arms cross, they are provided with recesses 8 adapted to receive the corresponding portion 9 of the adjacent arm. The outer faces of the arms are provided with projections or lugs 10, having V-shaped ends 11, as shown.

The operation of the device will be apparent from the foregoing description. The offset ends 5 or 6 of the arms are arranged in the openings in the bearing member, depending upon the size of these openings. The arms may be adjusted to openings spaced varying distances from each other by changing the angle between the arms. After the bearing member has been mounted in the arms, the lower ends are secured between the jaws of the vise, and the bearing rigidly supported to permit work thereon. As a downward pressure is generally exerted in working on the bearing, the offsets 10 are provided which are adapted to contact with the top of the jaws of the vise, to limit the downward movement of the arms. By providing the V-shaped ends, the projections are provided with a face or edge which will be in a horizontal plane, or substantially in a horizontal plane, and will thus form a relatively broad bearing surface for the support on the top of the jaw of the vise.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A supporting device for bearing members, comprising a pair of crossed arms pivoted to each other intermediate their ends and adapted to be arranged between the jaws of a vise, said arms being provided with offset ends disposed substantially parallel to each other, the ends of each arm being of different size and the two small ends of the arms being arranged adjacent to each other.

2. A supporting device for bearing members, comprising a pair of crossed arms adapted to be arranged between the jaws of a vise, the upper ends of said arms being arranged substantially parallel to each other and being adapted to be received in openings in a bearing member to support it, and projections formed on the outer side of said arms and adapted to engage the top of the vise to limit the downward movement of said member.

3. A supporting device for bearing members, comprising a pair of crossed arms substantially circular in cross-section, the contacting portions of said arms being flattened and provided with openings, a pivot pin arranged in said opening, and projections arranged on the outside of each of said arms adjacent the pivot pin and adapted to serve as stops to engage the top of a vise to limit the downward movement of said member, the ends of said arms being arranged substantially parallel and adapted to be received in openings in a bearing member.

In testimony whereof, I affix my signature in presence of two witnesses.

MATHIAS B. BANOWETZ.

Witnesses:
J. W. CAMPBELL,
H. SCHLENWOOD.